ized corners.

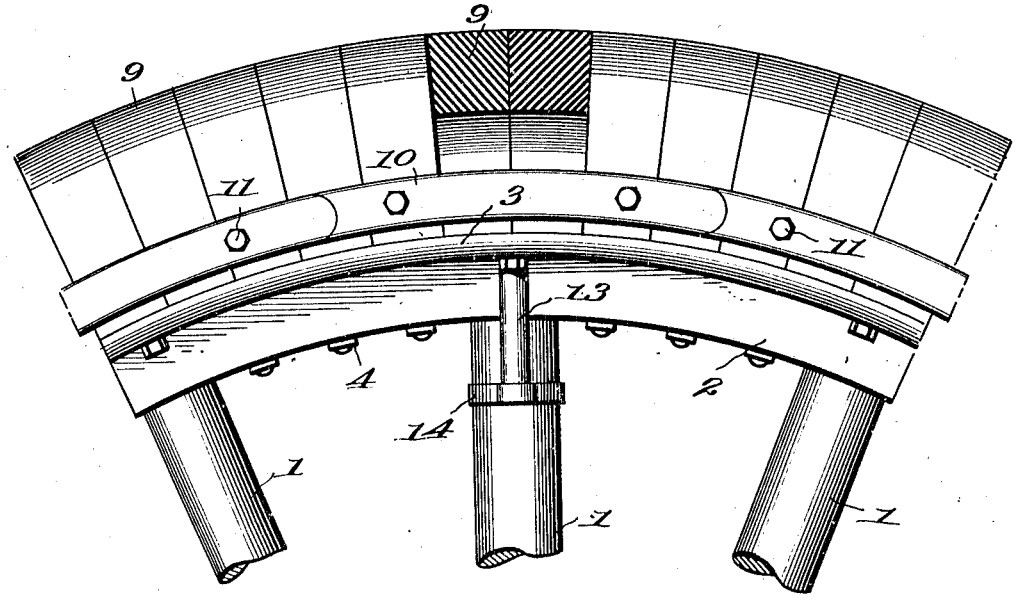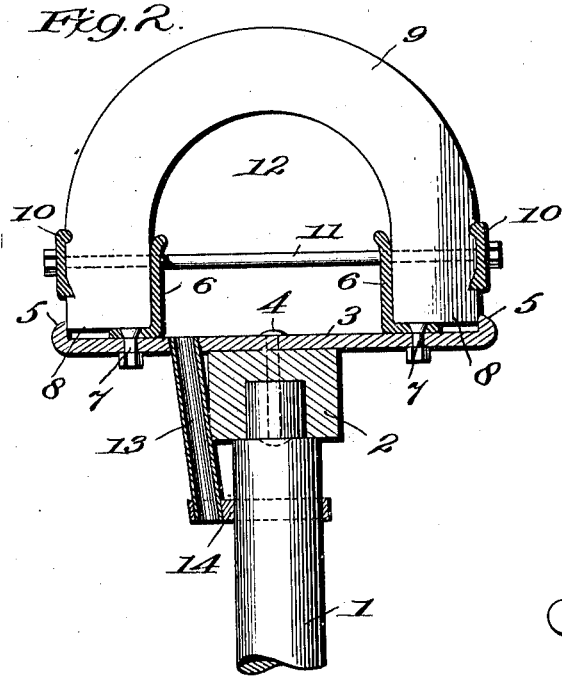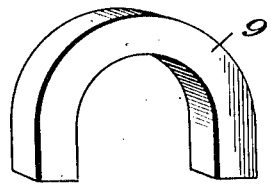

UNITED STATES PATENT OFFICE.

PERCY G. SEWARD, OF PETERSBURG, VIRGINIA, ASSIGNOR TO SEWARD RUBBER TIRE COMPANY, INC., OF PETERSBURG, VIRGINIA, A CORPORATION OF VIRGINIA.

VEHICLE-TIRE.

1,004,480.  Specification of Letters Patent.  Patented Sept. 26, 1911.

Application filed December 17, 1910. Serial No. 597,963.

*To all whom it may concern:*

Be it known that I, PERCY G. SEWARD, a citizen of the United States, residing at Petersburg, in the county of Dinwiddie and State of Virginia, have invented certain new and useful Improvements in Vehicle-Tires; and I do hereby declare the following to be a full, clear, and exact description of the invention, such as will enable others skilled in the art to which it appertains to make and use the same.

This invention relates to vehicle tires of a resilient nature, and has for its object to produce a substitute for the well known pneumatic tire which will be simple in construction, efficient in action, comparatively inexpensive to manufacture, and one which will not be rendered inoperative through punctures.
To these ends the invention consists in the novel details of construction and combinations of parts more fully hereinafter disclosed and particularly pointed out in the claims.

Referring to the accompanying drawings forming a part of this specification, in which like numerals designate like parts in all the views:—Figure 1 is an elevational view partly in section of a portion of a wheel equipped with my invention; Fig. 2 is a cross sectional view of the parts shown in Fig. 1; Fig. 3 is a perspective view of one of the resilient sections detached; and, Fig. 4 is a plan view of one of the metallic stay pieces for holding the resilient sections in place.

1 indicates the spokes, and 2 the outer rim of the wheel which may be of any suitable or desired construction, while 3 represents a steel rim piece secured to the part 2 as by means of the fasteners 4. The rim piece 3 is preferably turned up as at 5, and is provided with the inner holding bracket pieces 6 secured to said rim piece by the bolts 7. Between the members 5 and 6 securely fit the ends 8 of the resilient sections 9 preferably made of rubber, or other suitable resilient material, and extending along the sides of these sections 9 on the inner and outer surfaces of the tire thus produced, are the stay strips 10 through which, and the said sections 9, pass the stay bolts 11, as illustrated.

A hollow space 12 of considerable size is thus left on the interior of the tire, which permits the resilient sections 9 to become distorted or forced inward precisely as is now the case with a pneumatic tire, while 13 represents a tube secured to the spokes 1 as by the ring 14 and which serves to permit sand, water, or other material to escape after it has entered the space 12.

The sections 9 may be conveniently manufactured from a continuous rod of a suitable cross section, by merely cutting said rod into equal lengths and bending the pieces thus obtained into the form shown in the drawings. The stay strips 10 are preferably made in convenient lengths, so that they hold a given number of the sections 9 as a single entity, which may be as a single wheel section, so that the portions of the entire tire thus produced may be readily attached to or detached from the wheel rim.

Since the individual sections 9 may be individually distorted, it is evident that when the wheel goes around sharp curves, the said sections will be given a twisting action and, therefore, they will resist skidding more efficiently than would a continuous surface. It is further evident that the resiliency of the individual sections may be controlled by properly choosing the cross section of the original rod from which they are made, and also by choosing the material out of which they are made. When one or more sections wear out, it is a comparatively simple matter to remove the damaged member or members and to replace them with new ones.

It is evident that those skilled in the art may vary the details of construction and the arrangement of parts without departing from the spirit of my invention, and therefore I do not wish to be limited to such features except as may be required by the claims.

What I claim is:—

1. In a vehicle wheel provided with a rim the combination of a plurality of independent resilient strips of rubber bent into shape, placed side by side, constituting the tread of the wheel, and with said rim inclosing a hollow space; stay strips binding said resilient strips together; and means comprising L-shaped brackets for securing the latter to said rim, substantially as described.

2. In a vehicle wheel provided with a rim the combination of a tread member made of a plurality of parts inclosing with the said rim a hollow space; means to secure said tread member to said rim; means passing through said rim comprising a radially extending tube adapted to permit matter entering said space between said parts to escape; and a band attached to said wheel securing the inner end of said tube, substantially as described.

In testimony whereof, I affix my signature, in presence of two witnesses.

PERCY G. SEWARD.

Witnesses:
T. W. WITHERSPOON,
GEO. B. PITTS.